Dec. 29, 1931.  H. F. FISHER  1,838,934
ELECTRICAL TREATER HAVING ELONGATED OIL CIRCULATING PATH
Filed June 19, 1928   2 Sheets-Sheet 1

INVENTOR
HARMON F. FISHER
BY
Ford H. Harris
ATTORNEY

Dec. 29, 1931.  H. F. FISHER  1,838,934
ELECTRICAL TREATER HAVING ELONGATED OIL CIRCULATING PATH
Filed June 19, 1928   2 Sheets-Sheet 2
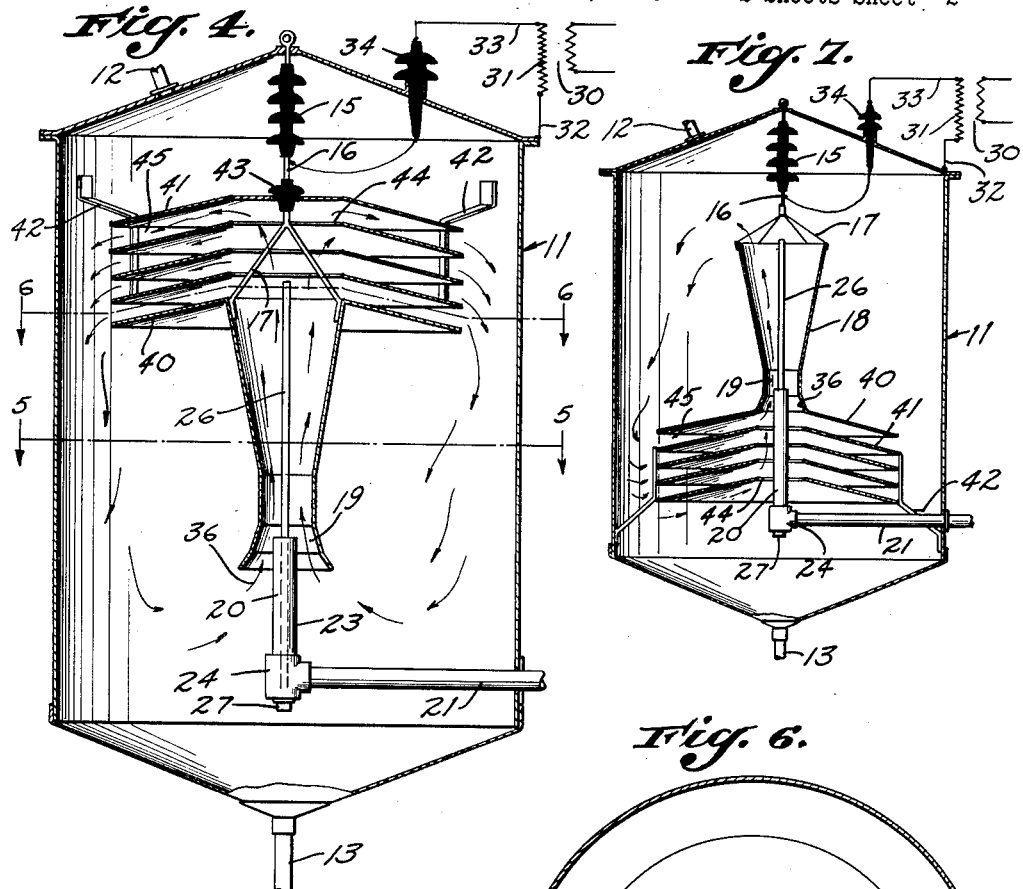
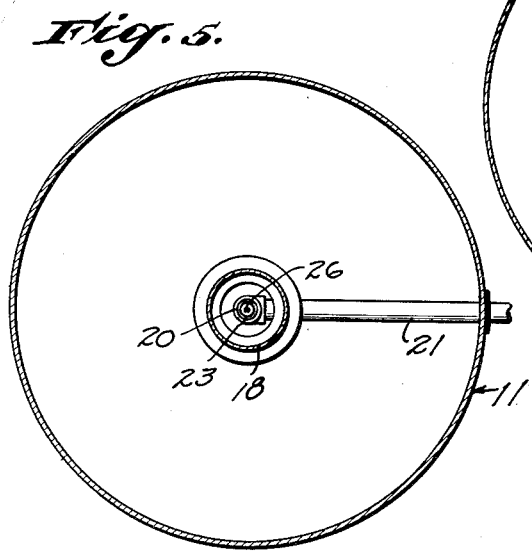
INVENTOR
HARMON F. FISHER
BY
Ford H. Harris
ATTORNEY Patented Dec. 29, 1931

1,838,934

UNITED STATES PATENT OFFICE

HARMON F. FISHER, OF LONG BEACH, CALIFORNIA, ASSIGNOR TO PETROLEUM RECTIFYING COMPANY OF CALIFORNIA, OF LOS ANGELES, CALIFORNIA, A CORPORATION OF CALIFORNIA

ELECTRICAL TREATER HAVING ELONGATED OIL CIRCULATING PATH

Application filed June 19, 1928. Serial No. 286,660.

This invention relates to electrical treaters for separating two dissimilar substances such as oil and water of an emulsion, and the invention has for its principal object to provide an efficient treater having a high treating capacity.

In certain co-pending applications, for instance, my application for dehydrator with means for directing emulsion through a high intensity field, Serial No. 203,253, filed July 2, 1927, I describe a treater having a central high intensity electrode and an outer low intensity electrode. The wet oil (emulsion) is passed through the treating space around the central electrode, and treated oil or dry oil is passed through the treating space around the wet oil to form a dielectric barrier which prevents short-circuits in the treating space. The treated oil makes a complete circuit around the outer electrode, being caused to flow by the injector effect of the wet oil.

In the operation of such an electrical treater, as I increase the amount of wet oil being treated at the electrode of highest field intensity by increasing the pressure on the nozzle and thereby increasing the velocity of the issuing wet oil stream, I find that the induced circulation of treated oil through the shield is also greatly increased. Since the rate of circulation is greatly increased and more wet oil is being treated in a given length of time, the percentage of water carried in suspension is also greatly increased because of the decreased settling period available. As this percentage of water in suspension increases, it soon reaches a condition where disruptive arcs or short-circuiting is caused in the gap between the concentrated field electrode and the surrounding electrode. Soon this state of disruptive arcing devolops into an impractical operating condition and this imposes a definite limitation upon the amount of oil which can be treated by a given treater. By overcoming this condition of disruptive arcing I find that the treating capacity may be increased as much as two to three times the original limited rate with unsettled treated oil in circulation.

It is an object of this invention to provide an electrical treater in which the circulating path for the treated oil is greatly elongated so that the treated oil will be given a greater settling period.

In treaters of the general class using central and outer electrodes, it is desirable to place the electrodes vertically so that more uniform results are obtained. The settling of the water particles from the oil is facilitated and expedited by the use of closely spaced trays which are disposed so that the oil to be settled is constrained to flow at a comparatively slow rate through the space between the trays, permitting ample settling time and at the same instant providing very short settling paths substantially transverse to the main flow through which the suspended agglomerated water masses fall before meeting a surface upon which they can collect, accumulate, and run off by way of some conducting pipe or conduit to the lowest part of the settling chamber.

It is another object of this invention to provide an electrical treater in which the treated oil is directed so that the settling of the water particles is facilitated and expedited.

Other objects and advantages of this invention will be pointed out in the following description.

The invention may be best understood by reference to the accompanying drawings, in which Fig. 1 is an elevational view showing one form of the invention.

Fig. 4 is a vertical section showing a form of the invention including settling paths.

Fig. 5 is a section taken on the line 5—5 of Fig. 4.

Fig. 6 is a section taken on the line 6—6 of Fig. 4.

Fig. 7 is a vertical section showing a third form of the invention, this form having the settling spaces for the emulsion.

Figure 1:
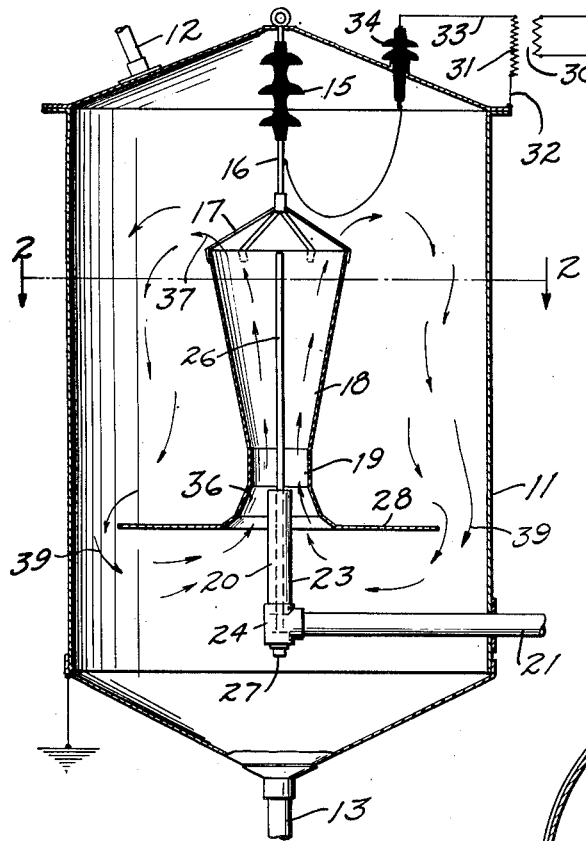
Figure 2:
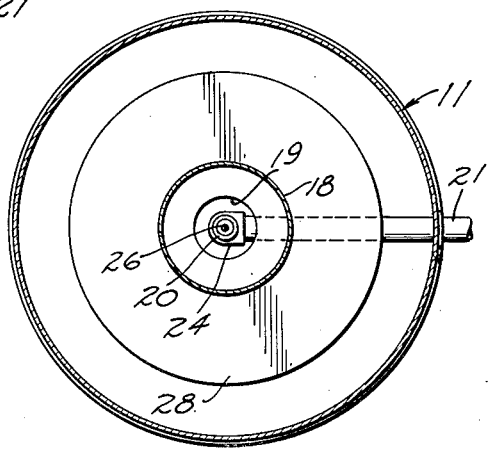
Fig. 2 is a section taken on the line 2—2 of Fig. 1.
Figure 3:
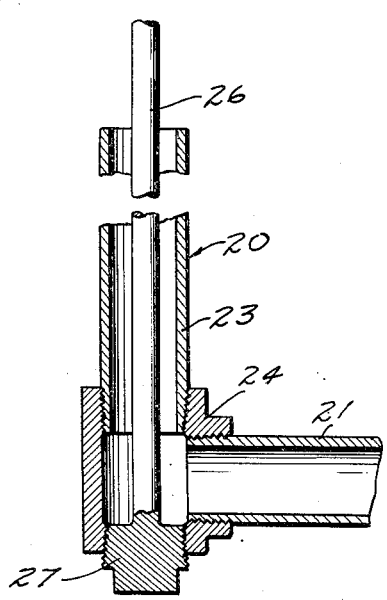
Fig. 3 is an enlarged sectional view of the nozzle employed in the invention.

Referring to Figs. 1 to 3 in which the first form of the invention is illustrated, the numeral 11 represents a tank having a dry oil outlet 12 at the upper end thereof and a precipitate outlet 13 at the lower end thereof. Supported in the top of the tank 11 is an insulator 15 which supports a rod 16. The lower end of the rod 16 is provided with arms 17 which are attached to a surrounding electrode 18, this electrode 18 being an electrode of lowest field intensity. The electrode 18 is of annular cross-section and the lower end thereof is provided with a mouth 19.

Extending upward into the mouth 19 of the surrounding electrode 18 is a fluid inlet pipe 20 which in the present invention is adapted to supply emulsion to the interior of the surrounding electrode 18. The fluid inlet pipe 20, as illustrated, has a horizontal leg 21 which passes through the side of the shell 11. As illustrated in Fig. 3, a vertical leg 23 of the fluid inlet pipe 20 is connected to the horizontal leg 21 by means of a fitting 24. Projecting upward through the vertical leg 23 of the fluid inlet pipe 20 is a central electrode 26 which is the electrode of highest field intensity. This electrode 26 extends vertically through the surrounding electrode 18. As illustrated in Fig. 3, the central electrode 26 is formed on a plug 27 which screws into the fitting 24.

Projecting outward from the surrounding electrode 18, preferably from the lower end thereof, is an annular baffle 28 which comprises an extremely important part of the invention.

The space between the central electrode 26 and the surrounding electrode 18 comprises a treating space in which an electric field is set up. This electric field is created by means of a transformer 30 having a secondary 31. The secondary 31 is connected to the shell 11 by a conductor 32, being connected to the central electrode 26 in this manner. The other side of the secondary 31 is connected by a conductor 33 which extends to the interior of the tank 11 through an inlet bushing 34, to the surrounding electrode 18, as illustrated.

The operation of this invention is as follows:

An electric field is first established in the treating space between the electrodes. Emulsion or other fluid is then supplied to the treating space through the fluid pipe 20. The vertical leg 23 directs the fluid or emulsion upward around the central electrode 26. The nozzle is so formed and the velocity of the emulsion is such that the emulsion will surround the central electrode 26 during almost its entire passage through the treating space inside the surrounding electrode 18. The tank 11 upon commencement of treatment of emulsion is filed with an oil having dielectric qualities which will provide a dielectric barrier. The injecting effect of the incoming emulsion causes the dry oil or dielectric barrier to flow into the mouth 19 of the surrounding electrode 18, as indicated by arrows 36, this barrier flowing upward and outward from the upper end of the surrounding electrode 18, as indicated by arrows 37. The emulsion in its passage through the electric field is acted upon so that the water particles are coalesced into masses of water of sufficient size to gravitate from the oil. These masses of water will gravitate from the oil in a short period of time but they do not separate or gravitate instantaneously. It is for this reason that in the ordinary treater not having the baffle 28, the amount of emulsion to be treated is limited because an increase of flow of emulsion increases the rate of circulation of the barrier so that the water particles cannot separate from the oil and so that the strength of the dielectric barrier is decreased.

In this invention the circulating path of the barrier is increased by the provision of the baffle 28. This baffle 28 causes the dielectric barrier to flow around the annular edge thereof, as indicated by arrows 39, this considerably increasing the circulating path and giving the water particles sufficient time to gravitate from the oil. As pointed out in the statement of invention, by this construction it is possible to increase the capacity of a given treater two to three times.

The second form of the invention dispenses with a baffle at the lower end thereof, but provides a series of baffles 40 and 41 at the upper ends thereof. The baffle 40 projects outward from the upper end of the surrounding electrode 18, whereas the other baffles are of a different polarity and are supported from the tank 11 by bracket straps 42. The upper baffle 41 supports an insulator 43 through which the rod 16 extends, whereas the other of the baffles 41 have cylindrical openings 44 provided therein. Each of the baffles 40 and 41 is conical and is separated by spaces which provide settling passages 45. In the operation of this form of the invention the emulsion is treated and as it flows from the upper end of the surrounding electrode 18, will pass into the settling passages 45 along with the dielectric barrier. The area of the settling passages 45 is much greater than the area of the surrounding electrode 18 so that the rate of travel of the emulsion is greatly decreased. The water particles will have ample time to precipitate from the oil during its passage through the passage 45, principally because the flow of emulsion is slowed up.

Another reason for a rapid settling is that the emulsion is caused to flow at right angles to the main flow through the treating space and in a horizontal direction so that the tendency of the water particles to gravitate is not greatly interfered with by the direction of flow by the main body of the emulsion. A further reason for an active settling action is that the water particles fall but a short distance before reaching a collecting surface;

namely, a baffle 40 or 41. It will be seen that if the water particles had to fall four inches before reaching a collecting surface, the time required would be substantially twice as long as where the water particles would fall but two inches. In this invention the passages through which the treated emulsion is passed are divided up so that the water particles fall but a very short distance before striking a collecting surface.

In Fig. 7, I illustrate a third form of the invention. In this form of the invention the baffle 40 and the baffles 41 are placed at the lower end of the surrounding electrode 18, the baffle 40 being supported by the lower end of the surrounding electrode 18 and the baffles 41 being supported by bracket straps 42. The baffles 41 each have openings 44 formed through them through which opening the vertical leg 23 and the lower end of the central electrode 26 extend. In this form of the invention the emulsion passes from the upper end of the surrounding electrode 18 and passes downward and into the outer ends of the settling passages 45. The settling action in these settling passages 45 is the same as in the second form of the invention shown in Figs. 4 and 5.

From the foregoing description it will be seen that the invention increases the capacity of a treater in a number of different ways; first, by prolonging the circulating path of the dielectric barrier to give proper settling time; second, by directing the emulsion horizontally so that the direction of flow of the treated emulsion does not interfere greatly with the precipitation of the water particles; and, third, by passing the emulsion through narrow settling passages so that the water particles must fall but a short distance before striking against a collecting surface.

I claim as my invention:

1. A treater comprising: an inner electrode; an outer electrode, there being a vertically disposed treating space between said electrodes; means for establishing an electric field in said treating space; means for passing a liquid to be treated into said space; a dielectric barrier adapted to flow through said treating space and around said outer electrode; and a baffle extending outward from the lower end of said outer electrode and around which said dielectric barrier flows.

2. A treater comprising: an inner electrode; an outer electrode, there being a treating space between said electrodes; means for establishing an electric field in said treating space; means for passing a liquid to be treated into said space; a dielectric barrier adapted to flow through said treating space and around said outer electrode; and a plurality of baffles extending outward from one end of said outer electrode and between which said dielectric barrier flows just before entering said treating space.

3. A treater comprising: an inner electrode; an outer electrode, there being a treating space between said electrodes; means for establishing an electric field in said treating space; means for passing a liquid to be treated into said space; a dielectric barrier adapted to flow through said treating space and around said outer electrode; and a plurality of substantially horizontal baffles extending outward from one end of said outer electrode and between which said dielectric barrier flows just before entering said treating space.

4. A treater comprising: a grounded electrode; a live electrode; means for impressing a potential difference between said electrodes whereby an electric field is set up in a treating space therebetween; a primary baffle electrically connected to said live electrode; and a plurality of grounded baffles cooperating to define equipotential settling passages, one of said grounded baffles lying adjacent said primary baffle to provide a settling passage under stress, said equipotential settling passages and said settling passage under stress communicating with said treating space.

5. A treater comprising: an inner electrode; a surrounding electrode open at its ends and cooperating with said inner electrode in defining a treating space; means for establishing a difference in potential between said electrodes; means for circulating a dielectric barrier around said outer electrode and through the outer portion of said treating space, the remainder of said treating space containing the fluid to be treated; a baffle electrically connected to and extending outward from said surrounding electrode in a manner to increase the length of the circulation path therearound; and another baffle adjacent said baffle and being at the same potential as said inner electrode, said baffles providing a settling passage through which the treated fluid and dielectric barrier pass.

6. A treater comprising: a plurality of superimposed baffles electrically connected together and providing equipotential settling passages therebetween, each of said baffles having an opening therethrough; an auxiliary baffle adjacent one of said superimposed baffles and cooperating therewith to provide a settling passage under stress; means extending through said openings and electrically connected to said auxiliary baffle for establishing an electric field in said settling passage under stress; and means for delivering the fluid to be treated to said settling passages.

7. A treater comprising: an inner electrode; a surrounding electrode open at its ends and cooperating with said inner electrode in defining a treating space; means for establishing a difference in potential between said electrodes; means for circulating a dielectric barrier around said outer electrode and through the outer portion of said treating space, the remainder of said treating space containing the fluid to be treated; and a baffle electrically connected to and extending outward from that end of said surrounding electrode at which said dielectric barrier enters said treating space, said baffle increasing the length of said closed circulation path.

8. A treater comprising: a primary electrode; a secondary electrode, there being a treating space between said electrodes; means for moving a dielectric medium and the liquid to be treated through said treating space; a pair of baffles insulated from each other and providing a settling passage communicating with said treating space and through which at least a portion of said dielectric medium and said liquid pass said settling passage extending substantially at right angles to the major axis of said treating space whereby said liquid and said dielectric medium flow substantially radially therein; and means for setting up electric fields in said treating space and in said settling passage.

In testimony whereof, I have hereunto set my hand at Los Angeles, California, this 12th day of June, 1928.

HARMON F. FISHER.